United States Patent
Park (10) Patent No.: US 8,829,854 B2
(45) Date of Patent: Sep. 9, 2014

(54) SECONDARY BATTERY

(75) Inventor: Jongdoo Park, Yongin-si (KR)

(73) Assignees: Samsung SDI Co., Ltd., Yongin-si, Gyeonggi-Do (KR); Robert Bosch GmbH, Stuttgart (DE)

(*) Notice: Subject to any disclaimer, the term of this patent is extended or adjusted under 35 U.S.C. 154(b) by 338 days.

(21) Appl. No.: 12/926,208

(22) Filed: Nov. 2, 2010

(65) Prior Publication Data

US 2011/0181247 A1  Jul. 28, 2011

(30) Foreign Application Priority Data

Jan. 27, 2010  (KR) .................. 10-2010-0007460

(51) Int. Cl.
*H02J 7/00* (2006.01)

(52) U.S. Cl.
USPC .......................................... 320/118; 324/433

(58) Field of Classification Search
USPC ........................................................ 320/118
See application file for complete search history.

(56) References Cited

U.S. PATENT DOCUMENTS

| | | |
|---|---|---|
| 2007/0063146 A1* | 3/2007 | Sasaki ...................... 250/396 R |
| 2007/0139007 A1 | 6/2007 | Lim et al. |
| 2008/0061764 A1* | 3/2008 | Tae et al. ......................... 324/72 |
| 2008/0088279 A1* | 4/2008 | Lim et al. ...................... 320/134 |
| 2008/0185995 A1* | 8/2008 | Carrier et al. ................. 320/134 |
| 2009/0319209 A1 | 12/2009 | Lim |
| 2010/0237873 A1* | 9/2010 | Franke et al. ................. 320/162 |

FOREIGN PATENT DOCUMENTS

| | | |
|---|---|---|
| KR | 10-0649570 B1 | 11/2006 |
| KR | 10 2007-0025718 A | 3/2007 |
| KR | 10 2010-0000196 A | 1/2010 |

* cited by examiner

*Primary Examiner* — Drew A Dunn
*Assistant Examiner* — Robert Grant
(74) *Attorney, Agent, or Firm* — Lee & Morse, P.C.

(57) ABSTRACT

A secondary battery includes a plurality of battery cells and measures voltages of the battery cells. The secondary battery includes a capacitive device, a relay and an A/D converter. The capacitive device is connected to the battery cells to sequentially store the voltages of the battery cells. The relay is between the battery cells and the capacitive device, and sequentially connects the battery cells to the capacitive device. The A/D converter is connected to the capacitive device to receive and convert the voltages of the battery cells.

3 Claims, 7 Drawing Sheets

SECONDARY BATTERY

BACKGROUND

1. Field

Embodiments relate to a secondary battery.

2. Description of the Related Art

Generally, a secondary battery denotes a battery that may be charged and discharged, as opposed to a primary battery, which is incapable of being charged. Small secondary batteries are widely used in advanced electronic equipment, e.g., portable phones, notebook computers and camcorders. Large secondary batteries are widely used for, e.g., driving the motors of electric cars and the motors of hybrid cars. Particularly, when a secondary battery is used in an electric car, since a battery cell has the limitations of capacity, many battery cells are connected in series and parallel and are bundled up as one, thereby forming the secondary battery.

However, since battery cells configuring one secondary battery have slight different characteristics, they cannot provide the same output in spite of the same charge/discharge condition. Accordingly, much research is being made for increasing the life of each of the battery cells by balancing the battery cells.

SUMMARY

Embodiments are therefore directed to a secondary battery, which substantially overcomes one or more of the problems due to the limitations and disadvantages of the related art.

It is therefore a feature of an embodiment to provide a secondary battery that can quickly measure the voltages of battery cells.

It is therefore another feature of an embodiment to provide a secondary battery that can accurately measure the voltages of battery cells.

According to at least one of embodiments, a secondary battery which includes a plurality of battery cells and measures voltages of the battery cells includes: a capacitive device connected to the battery cells to sequentially store the voltages of the battery cells; a relay between the battery cells and the capacitive device, sequentially connecting the battery cells to the capacitive device; and an A/D converter connected to the capacitive device to receive and convert the voltages of the battery cells.

The A/D converter may convert a voltage of a battery cell stored in the capacitive device, and the relay may connect another battery cell succeeding the battery cell to the capacitive device.

The relay may sequentially connect the battery cells to store the voltages of the battery cells in the capacitive device without discharging the capacitive device.

A first switching device selecting an over-charged battery cell and a resistor, which is serially connected to the first switching device to discharge the over-charged battery cell, may be further connected to each of battery cells.

A reference voltage source and a second switching device, which is serially connected to the reference voltage source, may be connected to both ends of the capacitive device.

The second switching device may be turned on before the voltage of the battery cell is applied to the capacitive device and thereby store the reference voltage of the reference voltage source in the capacitive device.

The reference voltage of the reference voltage source may be higher than the voltage of the battery cell.

The relay may be configured with an optical MOS relay.

BRIEF DESCRIPTION OF THE DRAWINGS

The above and other features and advantages will become more apparent to those of ordinary skill in the art by describing in detail exemplary embodiments with reference to the attached drawings, in which.

DETAILED DESCRIPTION

Korean Patent Application No. 10-2010-0007460 filed on Jan. 27, 2010, in the Korean Intellectual Property Office, and entitled: "Secondary Battery" is incorporated by reference herein in its entirety.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the disclosure to those skilled in the art.

Hereinafter, the configuration of a secondary battery according to an embodiment will be described in detail with reference to the accompanying drawings.

Figure 1:
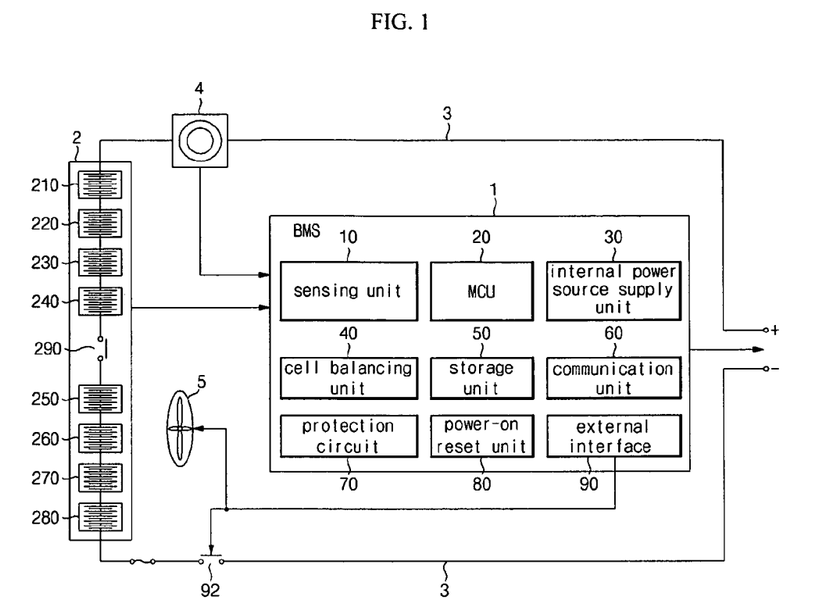
FIG. 1 illustrates a system block diagram of a secondary battery according to an embodiment.
Figure 2:
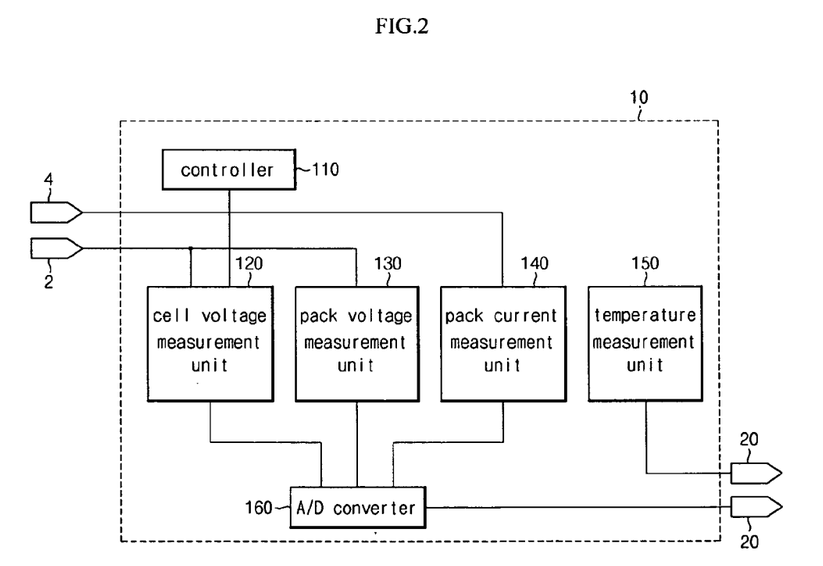
FIG. 2 illustrates a detailed block diagram of a sensing unit which is included in a secondary battery according to an embodiment.
Figure 3:
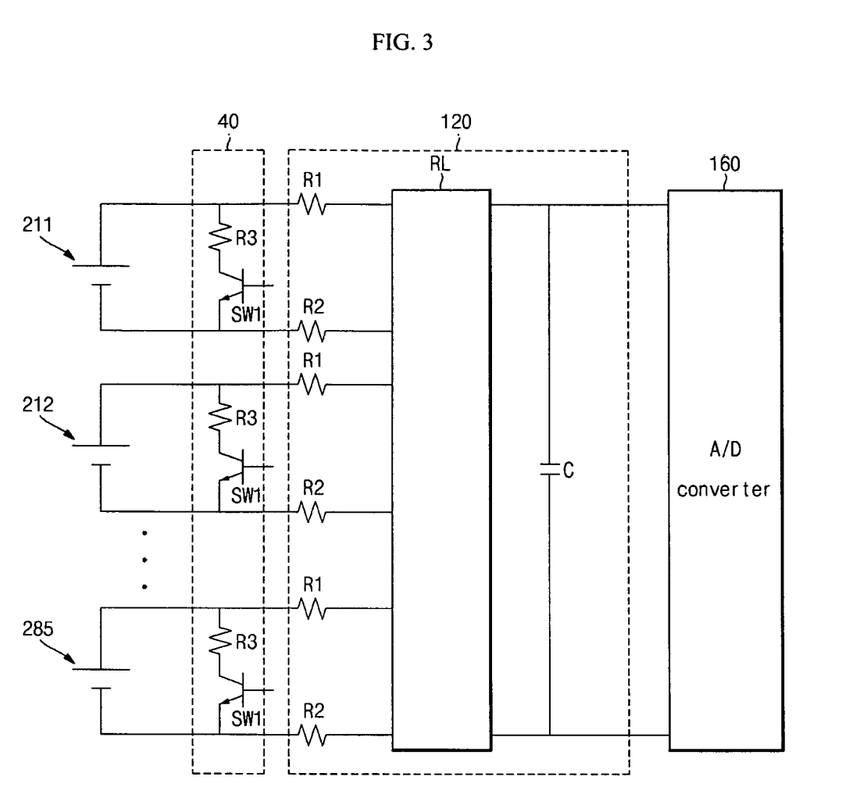
FIG. 3 illustrates a circuit diagram of a sensing unit which is included in a secondary battery according to an embodiment.

FIG. 1 illustrates a system block diagram of a secondary battery according to an embodiment. FIG. 2 illustrates a detailed block diagram of a sensing unit included in a secondary battery according to an embodiment. FIG. 3 illustrates a circuit diagram of a sensing unit included in a secondary battery according to an embodiment.

Referring to FIGS. 1 through 3, a secondary battery according to an embodiment includes a battery management system 1 and a battery pack 2. Moreover, the secondary battery may include a current line 3, a current sensor 4, and a cooling fan 5.

The battery management system 1 includes many elements for charging and discharging or protecting the battery pack 2. The battery management system 1 includes a sensing unit 10, a Motor Control Unit (MCU) 20, an internal power source supply unit 30, a cell balancing unit 40, a storage unit 50, a communication unit 60, a protection circuit 70, a power-on reset unit 80, and an external interface 90.

The sensing unit 10 may sense the total voltages of the battery pack 2, i.e., the individual voltage of each sub-pack 210 to 280 forming the battery pack 2, and the individual voltage of each battery cell 211 to 285, illustrated in FIG. 3, forming the sub-packs 210 to 280. Moreover, the sensing unit 10 may measure the temperatures of the battery cells 211 to 285 and temperatures peripheral to the battery cells 211 to 285. For this, the sensing unit 10 may include a controller 110, a cell voltage measurement unit 120 connected to the controller 110, a pack voltage measurement unit 130, a pack current measurement unit 140, and a temperature measurement unit 150. Furthermore, the voltages of the battery cells, the voltages of the sub-packs and the currents of the sub-packs, which are respectively measured by the cell voltage measurement unit 120, the pack voltage measurement unit 130 and the pack current measurement unit 140, are applied to and are converted by an analog-to-digital (A/D) converter 160, whereupon the converted voltages and currents are applied to the MCU 20.

As illustrated in FIG. 3, the cell voltage measurement unit 120 may include a relay RL connected to each of the battery cells 211 to 285 and a capacitive device C that is connected to the relay RL and receives the voltages of the battery cells 211 to 285 to apply the received voltages to the A/D converter 160, for measuring the battery cells 211 to 285. The cell voltage measurement unit 120 may also include resistors R1 and R2 to be connected to terminals of each battery cell 211 to 285.

Herein, the relay RL selects a battery cell to be measured from among the battery cells 211 to 285. The relay RL sequentially connects the battery cells 211 to 285 to the capacitive device C and thereby allows a voltage to be measured from the capacitive device C. The relay RL may be configured with an optical MOS relay, and sequentially connects the battery cells 211 to 285 to the capacitive device C. At this point, the capacitive device C stores the voltage values of the sequentially-connected battery cells 211 to 285 without discharge. Accordingly, since separate discharge is not required, the voltages of the battery cells 211 to 285 can be quickly measured, thereby preventing a leakage current that may be generated on a discharge path.

The MCU 20 determines the State of Charging (SOC) and State of Health (SOH) of the battery 2, on the basis of voltage values and temperature values received from the sensing unit 10. The MCU 20 controls the charge and discharge operation of the battery pack 2.

The internal power source supply unit 30 supplies a power source to the battery management system 1 through a sub-battery (not shown). The internal power source supply unit 30 may perform a charge operation with an external power source. As an example, when the battery pack 2 is used in vehicles, e.g., Hybrid Electric Vehicle (HEV) cars, the internal power source supply unit 30 may receive a power source from the lead storage battery of a car to perform charge.

The cell balancing unit 40 balances the charge and discharge states of the battery cells of the sub-packs 210 to 280 configuring the battery pack 2 to make the charge states of the battery cells uniform. The cell balancing unit 40 turns on a first switching device SW1 that is connected to a battery cell having a high charge state (i.e., a low discharge state) to form a discharge path through a resistor R3. Accordingly, a battery cell having a high charge state (i.e., a low discharge state) can maintain balance through discharge. By charging a battery cell having a low charge state (i.e., a high discharge state) among the battery cells, the cell balancing unit 40 controls the battery cells to have a uniform charge state.

When the battery management system 1 is turned off, the storage unit 50 stores data values such as an SOC and an SOH immediately before turn-off. Subsequently, when the battery management system 1 is again turned on, the MCU 20 may read a data value corresponding to the last turn-off time. For this, the storage unit 50 may be configured with a nonvolatile memory device that may be electrically written and read. As an example, the storage unit 50 may be configured with an Electronically Erasable Programmable Read Only Memory (EEPROM), but it is not limited thereto.

The communication unit 60 communicates with the controller or engine control unit (not shown) of a motor. The communication unit 60 enables the motor to use the power of the battery 2 and, when the motor is not driven, the communication unit 60 enables an engine to be driven.

The protection circuit 70 protects the battery from external impulses, an over current, and an over voltage. Moreover, when the battery management system 1 is turned on, the power-on reset unit 80 resets an entire system. Furthermore, the external interface 90 connects devices, e.g., the cooling fan 5 and the main switch 92 of the charge/discharge current line 3 to the MCU 20.

Figure 4:
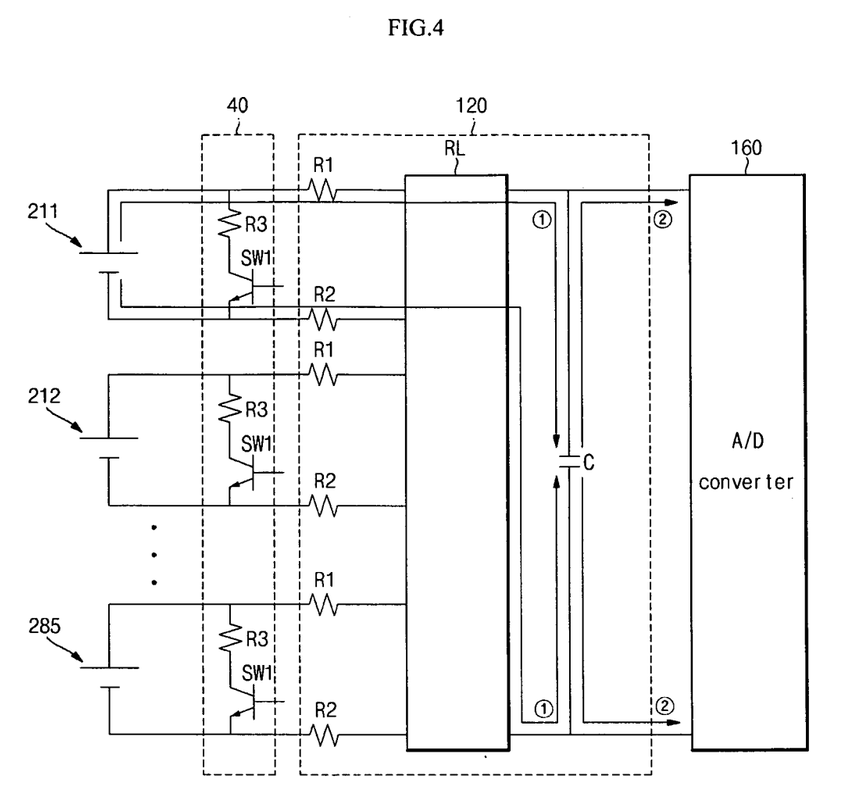
FIGS. 4 and 5 illustrate operations in which the secondary battery according to an embodiment measures the voltages of battery cells.
Figure 5:
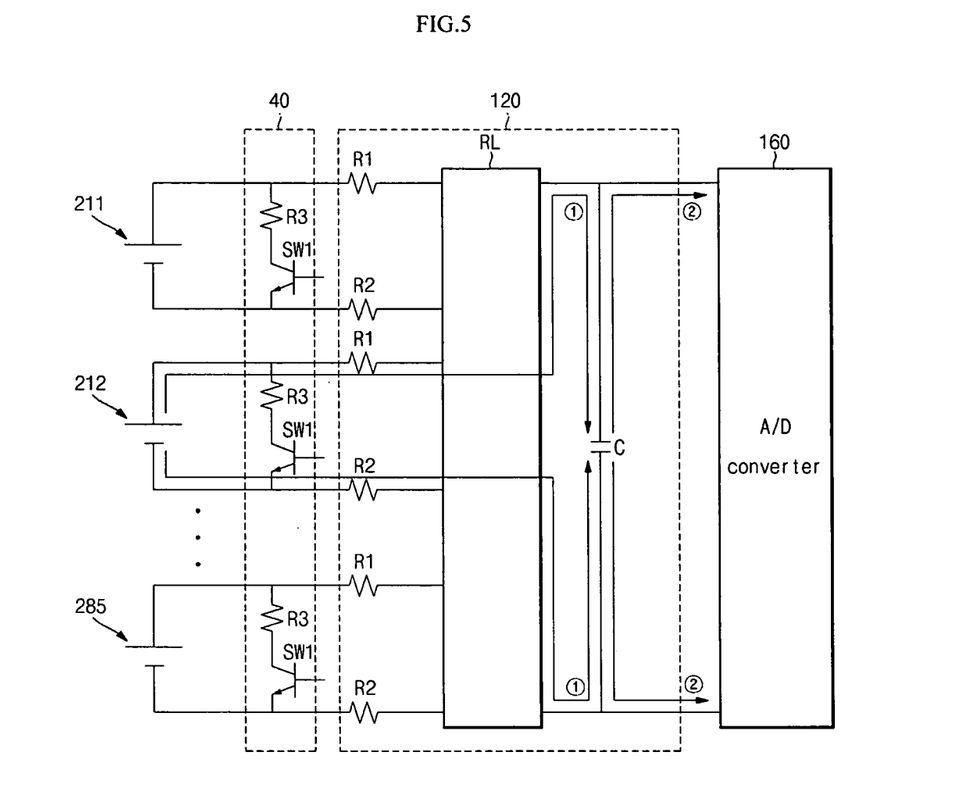
Figure 6:
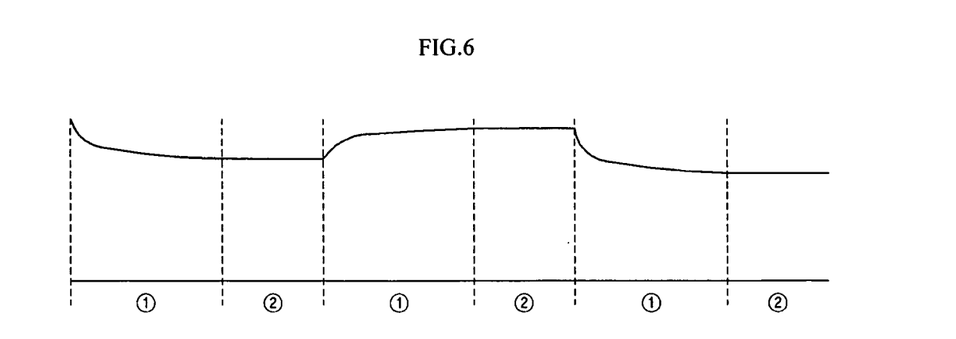
FIG. 6 illustrates the both-end voltages over time of a capacitive device which configures the sensing unit of the secondary battery according to an embodiment.

The following description is of an operation in which the secondary battery according to an embodiment measures the voltages of battery cells. FIGS. 4 and 5 illustrate operations in which the secondary battery according to an embodiment measures the voltages of battery cells. FIG. 6 illustrates the both-end voltages over time of the capacitive device which configures the sensing unit of the secondary battery according to an embodiment.

Referring first to FIG. 4, the relay RL connects any one (for example, the first battery cell 211) of the battery cells 211 to 285 to the capacitive device C. Accordingly, the voltage of battery cell 211 is stored in the capacitive device C through a path ①. At this point, since the capacity of the capacitive device C has a very small value relative to the capacity of the battery cell 211, the electric potential of the battery cell 211 is not substantially shifted by the operation. Subsequently, the relay RL breaks a path between the battery cell 211 and the capacitive device C. A voltage stored in the capacitive device C is applied to the A/D converter 160 through a path ②. Thus, the voltage of the first battery cell 211 may be measured.

Referring to FIG. 5, the relay RL connects, for example, the second battery cell 212 to the capacitive device C. At this point, in a state where the capacitive device C stores the voltage of the first battery cell 211, the capacitive device C is connected to the second battery cell 212 through a path ①. When the voltage of the first battery cell 211 differs from that of the second battery cell 212, the capacitive device C is shifted until the voltage of the second battery cell 212 is reached. In a state where the capacitive device C stores the voltage of the second battery cell 212, the relay RL breaks a path between the second battery cell 212 and the capacitive device C. Moreover, the voltage of the second battery cell 212 stored in the capacitive device C is transferred to the A/D converter 160 through a path ② and is measured.

Similarly, the battery cells succeeding the second battery cell 212 are sequentially measured though the capacitive device C by the same operation, and a voltage that is measured in the both ends of the capacitive device C is as shown in FIG. 6. As a result, the capacitive device C may measure the voltage values of the battery cells 211 to 285 that are sequentially connected without discharge. Accordingly, as described above, the voltages of the battery cells 211 to 285 can be quickly measured, thereby preventing a leakage current that may be generated on a discharge path.

Hereinafter, the configuration of a secondary battery according to another embodiment will be described.

Figure 7:
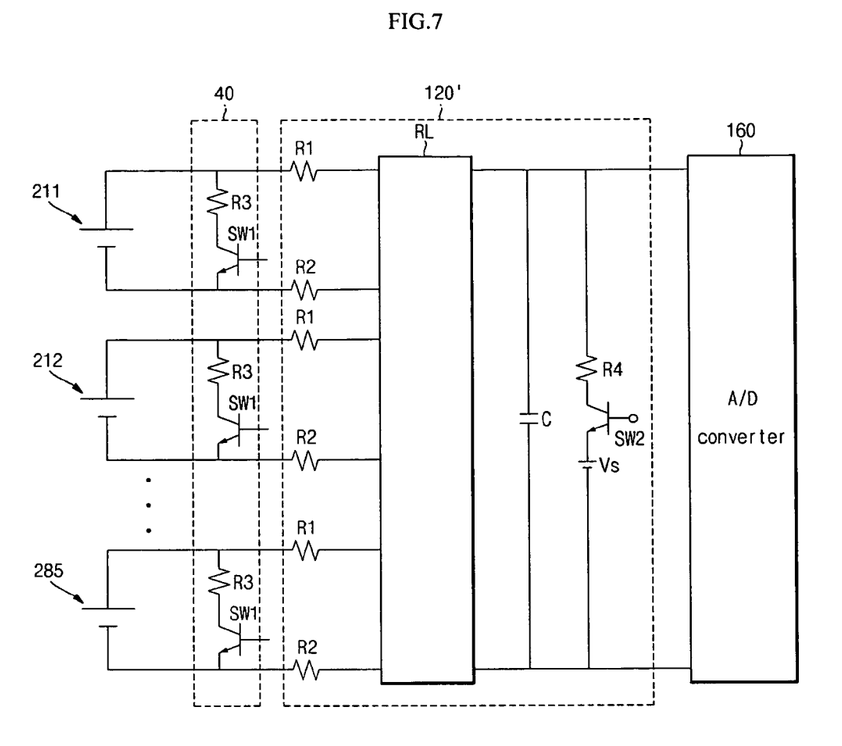
FIG. 7 illustrates a detailed block diagram of a sensing unit which is included in a secondary battery according to another embodiment.

FIG. 7 illustrates a detailed block diagram of a sensing unit which is included in a secondary battery according to another embodiment. Like reference numerals refer to like elements having the same configuration and operation as those of the preceding embodiment, and the following description will be focused on differences.

Referring to FIG. 7, a cell voltage measurement unit 120' may further include a resistor R4, a second switching device SW2, and a reference voltage source Vs connected to the both ends of the capacitive device C.

The second switching device SW2 is turned on immediately before the voltages of the battery cells 211 to 285 are applied to the capacitive device C. Accordingly, the capacitive device C may be initialized with the reference voltage of the reference voltage source Vs.

Figure 8:
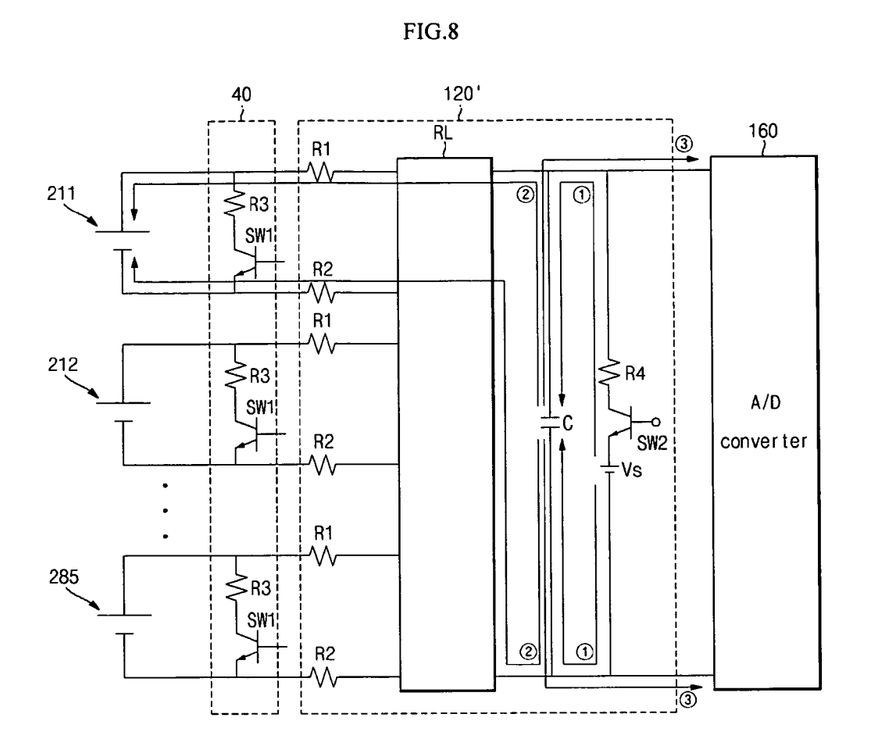
FIGS. 8 and 9 illustrate operations in which the secondary battery according to another embodiment measures the voltages of battery cells.
Figure 9:
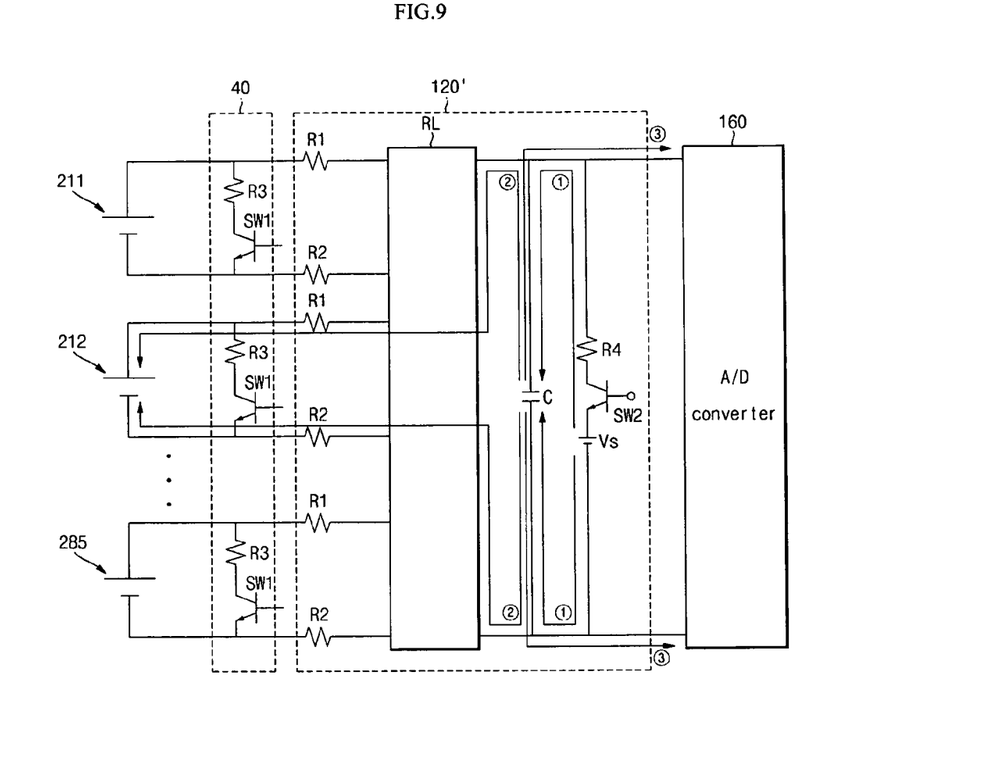
Figure 10:
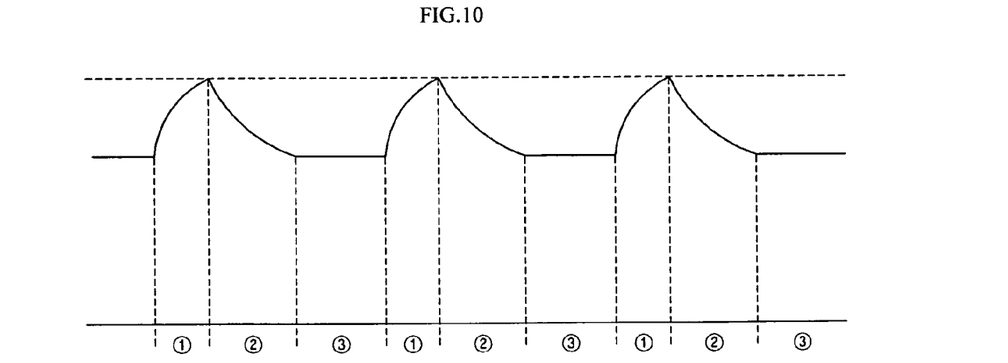
FIG. 10 illustrates the both-end voltages over time of the capacitive device which configures the sensing unit of the secondary battery according to another embodiment.

The following description will be made on an operation in which the secondary battery according to another embodiment measures the voltages of battery cells. FIGS. 8 and 9 illustrate operations in which the secondary battery according to another embodiment measures the voltages of battery cells. FIG. 10 illustrates the both-end voltages over time of the capacitive device which configures the sensing unit of the secondary battery according to another embodiment.

Referring first to FIG. 8, in a state where the relay RL breaks a path between the battery cells 211 to 285 and the capacitive device C, the second switching device SW2 is turned on. Accordingly, the reference voltage of the reference voltage source Vs is applied to the capacitive device C through a path ①, and the stored voltage value of the capacitive device C is initialized into the reference voltage.

Subsequently, the second switching device SW2 is turned off, and the relay RL connects a path between any one (for example, the first battery cell 211) of the battery cells 211 to 285 and the capacitive device C. Consequently, a voltage corresponding to the voltage of the first battery cell 211 is stored in the capacitive device C through a path ②.

Next, the relay RL breaks the path between the battery cell 211 and the capacitive device C, and the voltage of the first battery cell 211 stored in the capacitive device C may be applied to the A/D converter 160 through a path ③ and be thereby measured.

Referring to FIG. 9, the capacitive device C is initialized by the reference voltage of the reference voltage source Vs through a path ①. Moreover, the second battery cell 212 is connected to the capacitive device C by the relay RL and thereby the voltage of the second battery cell 212 is stored in the capacitive device C through a path ②. When the relay RL breaks a path between the second battery cell 212 and the capacitive device C, the capacitive device C is connected to the A/D converter 160 through a path ③, whereupon the voltage of the second battery cell 212 is applied and thereby measured.

The voltages of the battery cells succeeding the second battery cell 212 are measured though the same operation, and a voltage that appears across the both ends of the capacitive device C may have a result as shown in FIG. 10.

Accordingly, the secondary battery according to another embodiment initializes the capacitive device C. Such an initialized capacitive device may more quickly and accurately measure the voltages of the battery cells 211 to 285, thereby preventing a leakage current that may be generated on a discharge path.

The secondary battery according to exemplary embodiments allows the capacitive device to store the voltage values of the battery cells that are sequentially connected and does not perform a separate discharge operation, quickly measuring the voltages of the battery cells. Accordingly, the secondary battery can prevent the leakage current that may be generated on the discharge path.

Moreover, the secondary battery according to exemplary embodiments initializes the capacitive device with the reference voltage source before the voltages of the battery cells are applied, and thus can more quickly and accurately measure the voltages of the battery cells.

Exemplary embodiments have been disclosed herein, and although specific terms are employed, they are used and are to be interpreted in a generic and descriptive sense only and not for purpose of limitation. Accordingly, it will be understood by those of ordinary skill in the art that various changes in form and details may be made without departing from the spirit and scope of the present disclosure as set forth in the following claims.

What is claimed is:

1. A secondary battery which includes a plurality of battery cells and measures voltages of the battery cells, the secondary battery comprising:
   a capacitive device connected to the battery cells to sequentially store the voltages of the battery cells;
   a relay between the battery cells and the capacitive device, sequentially connecting the battery cells to the capacitive device;
   an A/D converter connected to the capacitive device to receive and convert the voltages of the battery cells;
   a reference voltage source; and
   a switching device serially connected to the reference voltage source when the relay sequentially connects the battery cells to the capacitive device, the reference voltage source and the switching device being connected to ends of the capacitive device, and wherein the switching device is turned on before the voltage of each of the battery cells is applied to the capacitive device, to thereby store a reference voltage of the reference voltage source in the capacitive device, the reference voltage added to each of the voltages of the battery cells.

2. The secondary battery as claimed in claim 1, wherein the reference voltage of the reference voltage source is higher than the voltage of the battery cell.

3. The secondary battery as claimed in claim 1, wherein the switching device is between the reference voltage source and the capacitive device, wherein the switching device is turned on before the voltage of each of the battery cells is applied to the capacitive device to thereby store the reference voltage of the reference voltage source in the capacitive device, the reference voltage being stored in the capacitive device while the capacitive device is connected to each of the battery cells.

* * * * *